(12) United States Patent
Chivilikhin et al.

(10) Patent No.: US 8,440,155 B2
(45) Date of Patent: May 14, 2013

(54) FLOW MODULATING SUBSTRATES FOR EARLY LIGHT-OFF

(75) Inventors: Mikhail Sergeevich Chivilikhin, St. Petersburg (RU); David R Heine, Horseheads, NY (US); Ameya Joshi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 19 days.

(21) Appl. No.: 13/213,755

(22) Filed: Aug. 19, 2011

(65) Prior Publication Data

US 2013/0045148 A1    Feb. 21, 2013

(51) Int. Cl.
*B01D 53/94* (2006.01)
*F01N 3/10* (2006.01)
*F01N 3/28* (2006.01)

(52) U.S. Cl.
USPC .......................... 423/212; 423/213.2; 60/299

(58) Field of Classification Search .................. 423/212, 423/213.2; 60/299
See application file for complete search history.

(56) References Cited

U.S. PATENT DOCUMENTS

| | | | |
|---|---|---|---|
| 3,853,485 A | 12/1974 | Hogan | 23/288 F |
| 5,108,685 A | 4/1992 | Kragle | 264/177.12 |
| 5,108,716 A * | 4/1992 | Nishizawa | 422/171 |
| 5,393,499 A | 2/1995 | Bagley et al. | 422/174 |
| 5,934,069 A | 8/1999 | Hertl et al. | 60/274 |
| 7,041,622 B2 | 5/2006 | Nunan | 502/327 |
| 7,442,425 B2 | 10/2008 | Fu et al. | 428/116 |
| 7,722,827 B2 | 5/2010 | Fischer et al. | 422/168 |
| 2009/0104096 A1* | 4/2009 | Patchett et al. | 423/213.5 |
| 2011/0162348 A1* | 7/2011 | Kim et al. | 60/274 |

FOREIGN PATENT DOCUMENTS

| | | |
|---|---|---|
| EP | 0153157 | 2/1985 |
| EP | 1983166 | 10/2008 |
| GB | 2342055 | 4/2000 |
| WO | 2008/060563 | 5/2008 |
| WO | 2008/077887 | 7/2008 |

OTHER PUBLICATIONS

"Ultra Thinwall Light-Off Performance—Varying Substrates, Catalysts, and Flow Rates; Models and Engine Testing"; Hughes et al; 2002-01-0352; SAE Technical Paper Series; Advanced Catalysts and Substrates; SAE International, Mar. 2002.

* cited by examiner

*Primary Examiner* — Timothy Vanoy
(74) *Attorney, Agent, or Firm* — Matthew J. Mason

(57) ABSTRACT

An exhaust gas after-treatment system includes at least first and second substrates. The first substrate has a first region and a second region circumferentially surrounding the first region. The first region of the first substrate has a higher average cell density than the average cell density of the second substrate. The system can also include at least a third substrate.

18 Claims, 11 Drawing Sheets

FLOW MODULATING SUBSTRATES FOR EARLY LIGHT-OFF

BACKGROUND

The disclosure relates generally to ceramic substrates and particularly to substrates that modulate the flow of fluid being passed through them.

Modern emission control devices are very efficient at converting emissions to benign products at high temperatures. For example, three-way catalysts (TWC) have been utilized for the removal of carbon monoxide (CO), hydrocarbons (HC) and nitrogen oxides (NOx) from the exhaust of automobile engines for many years. However, when temperatures are below a certain level, such as during "cold start" of a motorized vehicle, such conversion is relatively poor due to reaction rate and mass transfer limitations. Following cold start, the catalyst temperature and conversion efficiency increases. For a given polluting species, the time from cold start to the time the catalytic device converts 50% of the species to benign products is often referred to as the "light-off time." This light-off time can typically be tens of seconds, if not longer. Because of increasingly stringent emission control standards, there is an ever increasing need to reduce light-off time without substantially sacrificing the overall longer term performance of the emission control device.

SUMMARY

One embodiment of the disclosure relates to an exhaust gas after-treatment system. The system includes a first substrate having a first region and a second region circumferentially surrounding the first region. The system also includes a second substrate downstream from the first substrate. The first region of the first substrate has a higher average cell density than the average cell density of the second substrate.

Another embodiment of the disclosure relates to a method of operating an exhaust gas after-treatment system. The method includes, during a cold-start, directing exhaust gas through a first substrate having a first region and a second region circumferentially surrounding the first region. The method also includes directing exhaust gas through a second substrate downstream from the first substrate. The first region of the first substrate has a higher average cell density than the average cell density of the second substrate.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments of the disclosure will be described in detail with reference to the drawings, if any.

As used herein, the term "downstream" refers to being in the same direction as the direction of fluid flow, relative to a reference point, in an exhaust stream flow path.

As used herein, the term "upstream" refers to being in the opposite direction as the direction of fluid flow, relative to a reference point, in an exhaust stream flow path.

As used herein, the term "average cell density" refers to the total number of cells in a given cross sectional area (such as an end face) of a part, divided by that cross sectional area.

As used herein, the term "cold start" refers to the time when an internal combustion engine is started after not being operated for at least two hours or when the engine temperature immediately prior to being started is at or below 50° C.

As used herein, "target species" refers to at least one exhaust gas species intended to be converted to one or more benign products through an exhaust gas after-treatment system. Examples of target species include carbon monoxide (CO), nitrogen oxides (NOx) and hydrocarbons (HC).

As used herein, "light-off time" refers to the time at least 50% of at least one target species is converted to one or more benign products.

Embodiments disclosed herein include those relating to three-way catalyst (TWC) exhaust gas after-treatment systems, particularly with respect to the details relevant to performance predictions of the systems from an emissions/light-off perspective. However, it is to be understood that the principles described herein are not so limited, but rather are equally applicable to other after-treatment systems which rely on catalytic conversion of pollutants, such as selective catalytic reduction (SCR) devices and diesel oxidation catalyst (DOC) devices.

Figure 1:
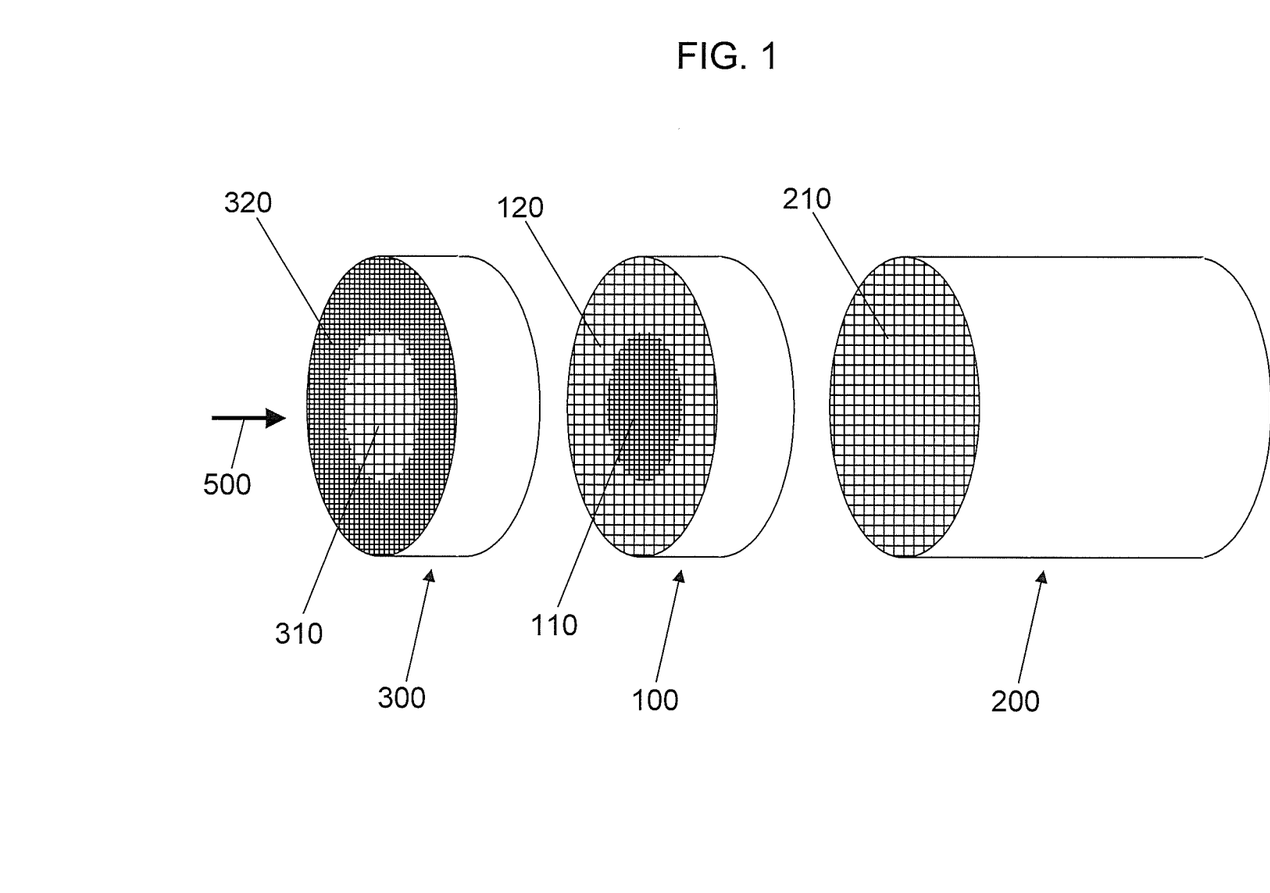
FIG. 1 illustrates an isometric view of an exemplary combination of substrates according to embodiments disclosed herein.

FIG. 1 illustrates an exemplary combination of substrates that can be used in exhaust gas after-treatment systems according to embodiments disclosed herein. The combination of substrates includes a first substrate 100, a second substrate 200 downstream from the first substrate 100, and a third substrate 300, upstream from the first substrate 100, wherein arrow 500 indicates the direction of fluid flow through the substrates.

The first substrate 100 includes a first region 110 and a second region 120 circumferentially surrounding the first region 110. The first region 110 has a higher average cell density than the average cell density of the second substrate (shown as having a single region 210 of approximately uniform average cell density).

For example, the average cell density of the first region 110 can be at least 1.5 times, such as at least 2 times, and further such as at least 2.5 times, and yet further such as at least 3 times the average cell density of region 210.

The first region 110 also has a higher average cell density than the second region 120. For example, the average cell density of the first region 110 can be at least 1.5 times, such as at least 2 times, and further such as at least 2.5 times, and yet further such as at least 3 times the average cell density of the second region 120.

The average wall thickness of the first region 110 and the second region 120 may be the same or different. For example, when different, the average wall thickness of the second region 120 can be at least 1.2 times, such as at least 1.5 times, and further such as at least 2, and yet further such as at least 2.5 times the average wall thickness of the first region 110.

The first region 110 can, in exemplary embodiments, extend from a central axis of the first substrate 100 to at least 25%, and further such as at least 50%, and yet further such as at least 75% and still yet further such as at least 90% of an outer radius of the first substrate 100.

The third substrate 300 includes a first region 310 and a second region 320 circumferentially surrounding the first region 310. The first region 110 of the first substrate 100 has a higher average cell density than the first region 310 of the third substrate 300.

For example, the average cell density of first region 110 can be at least 1.5 times, such as at least 2 times, and further such as at least 2.5 times, and yet further such as at least 3 times the average cell density of first region 310.

Second region 320 also has a higher average cell density than first region 310. For example, the average cell density of second region 320 can be at least 1.5 times, such as at least 2 times, and further such as at least 2.5 times, and yet further such as at least 3 times the average cell density of first region 310.

Second region 320 also has a higher average cell density than second region 120. For example, the average cell density of second region 320 can be at least 1.5 times, such as at least 2 times, and further such as at least 2.5 times, and yet further such as at least 3 times the average cell density of second region 120.

The average wall thickness of the first region 310 and the second region 320 may be the same or different. For example, when different, the average wall thickness of the first region 310 can be at least 1.2 times, such as at least 1.5 times, and further such as at least 2, and yet further such as at least 2.5 times the average wall thickness of the second region 320.

The first region 310 can, in exemplary embodiments, extend from a central axis of the third substrate 300 to at least 25%, and further such as at least 50%, and yet further such as at least 75% and still yet further such as at least 90% of an outer radius of the third substrate 300.

First region 110 and second region 320 can have an average cell density or wall thickness that is the same or different. For example, when different, first region 110 can have an average cell density that is larger than second region 320 or first region 110 can have an average cell density that is smaller than second region 320.

In certain exemplary embodiments, each of first region 110 and second region 320 have an average cell density ranging from about 400 to 1,400 cells per square inch, such as about 600 to 1,200 cells per square inch, and further such as about 800 to 1,000 cells per square inch, including about 900 cells per square inch. Each of first region 110 and second region 320 may, in certain exemplary embodiments, have an average wall thickness from about 1 to 6 mils, including from about 2 to 4 mils, including about 2 mils. In one exemplary embodiment, each of first region 110 and second region 320 has an average cell density of about 900 cells per square inch and an average wall thickness of about 2 mils.

Second region 120, region 210, and first region 310 can have an average cell density or wall thickness that is the same or different. In that regard, at least two of second region 120, region 210, and first region 310 can have an average cell density that is approximately the same or each of second region 120, region 210, and first region 310 can have different average cell densities. For example, second region 120 can have an average cell density that is larger or smaller than either of region 210 or first region 310. Alternatively, region 210 can have an average cell density that is larger or smaller than either of second region 120 or first region 310. Alternatively, first region 310 can have an average cell density that is larger or smaller than either of first region 120 or region 210.

In certain exemplary embodiments, each of second region 120, region 210, and first region 310 have an average cell density ranging from about 100 to 800 cells per square inch, such as about 200 to 600 cells per square inch, including about 400 cells per square inch. Each of second region 120, region 210, and first region 310 may, in certain exemplary embodiments, have an average wall thickness from about 1 to 10 mils, including from about 2 to 6 mils, including about 4 mils. In one exemplary embodiment, each of second region 120, region 210, and first region 310 has an average cell density of about 400 cells per square inch and an average wall thickness of about 4 mils.

In certain exemplary embodiments, the average cell density of any of first region 110 or second region 320 is at least 100 cells per square inch greater, such as at least 200 cells per square inch greater, and further such as at least 400 cells per square inch greater, and yet further such as at least 600 cells per square inch greater than the average cell density of any of second region 120, region 210, or first region 310.

The axial lengths of the first substrate 100, second substrate 200, and third substrate 300 can be the same or different. In certain exemplary embodiments, the second substrate 200 has an axial length that is at least twice an axial length of the first substrate 100. In certain exemplary embodiments, the second substrate 200 has an axial length that is at least twice the axial length of the third substrate 300. In certain exemplary embodiments, the second substrate 200 has an axial length that is greater than or equal to combined axial lengths of the first substrate 100 and the third substrate 300. In certain exemplary embodiments, the first substrate 100 and the third substrate 300 can have approximately the same axial lengths, which are both shorter than the axial length of the second substrate 200.

Each of the first substrate 100 and the third substrate 300 can, in certain exemplary embodiments, have axial lengths ranging from 1 to 3 inches while, in such embodiments, the third substrate can have an axial length ranging from 2 to 6 inches. For example, in one embodiment, each of the first substrate 100 and the third substrate 300 has an axial length of about 1.5 inches and the second substrate 200 has an axial length of about 3 inches.

Each of the second substrate 200 and third substrate 300 may be adjacent to or axially spaced apart from the first substrate 100. When axially spaced apart, each of the second substrate 200 and third substrate 300 may be axially spaced the same or different distances from the first substrate 100. For example, the first substrate 100 and the second substrate 200 may be axially spaced apart such that the axial distance between their nearest surfaces is at least 10%, such as at least 25%, and further such as at least 50%, and yet further such as at least 100% of the axial length of the first substrate 100. Likewise, the first substrate 100 and the third substrate 300 may be axially spaced apart such that the axial distance between their nearest surfaces is at least 10%, such as at least 25%, and further such as at least 50%, and yet further such as at least 100% of the axial length of the first substrate 100.

In certain exemplary embodiments, the first substrate 100 can be axially spaced from either the second substrate 200 or the third substrate 300 such that the axial distance between their nearest surfaces is at least 0.1 inches, such as between 0.1 and 2 inches, and further such as between 0.2 and 1 inch. For example, in one embodiment, the first substrate 100 is axially spaced from the second substrate 200 such that the axial distance between their nearest surfaces is about 0.25 inches and axially spaced from the third substrate 300 such that the axial distance between their nearest surfaces is about 0.5 inches.

In certain exemplary embodiments, each of the first substrate 100, second substrate 200, and third substrate 300, whether adjacent to each other or axially spaced apart from each other, are enclosed (or "canned") in the same housing.

Figure 2:
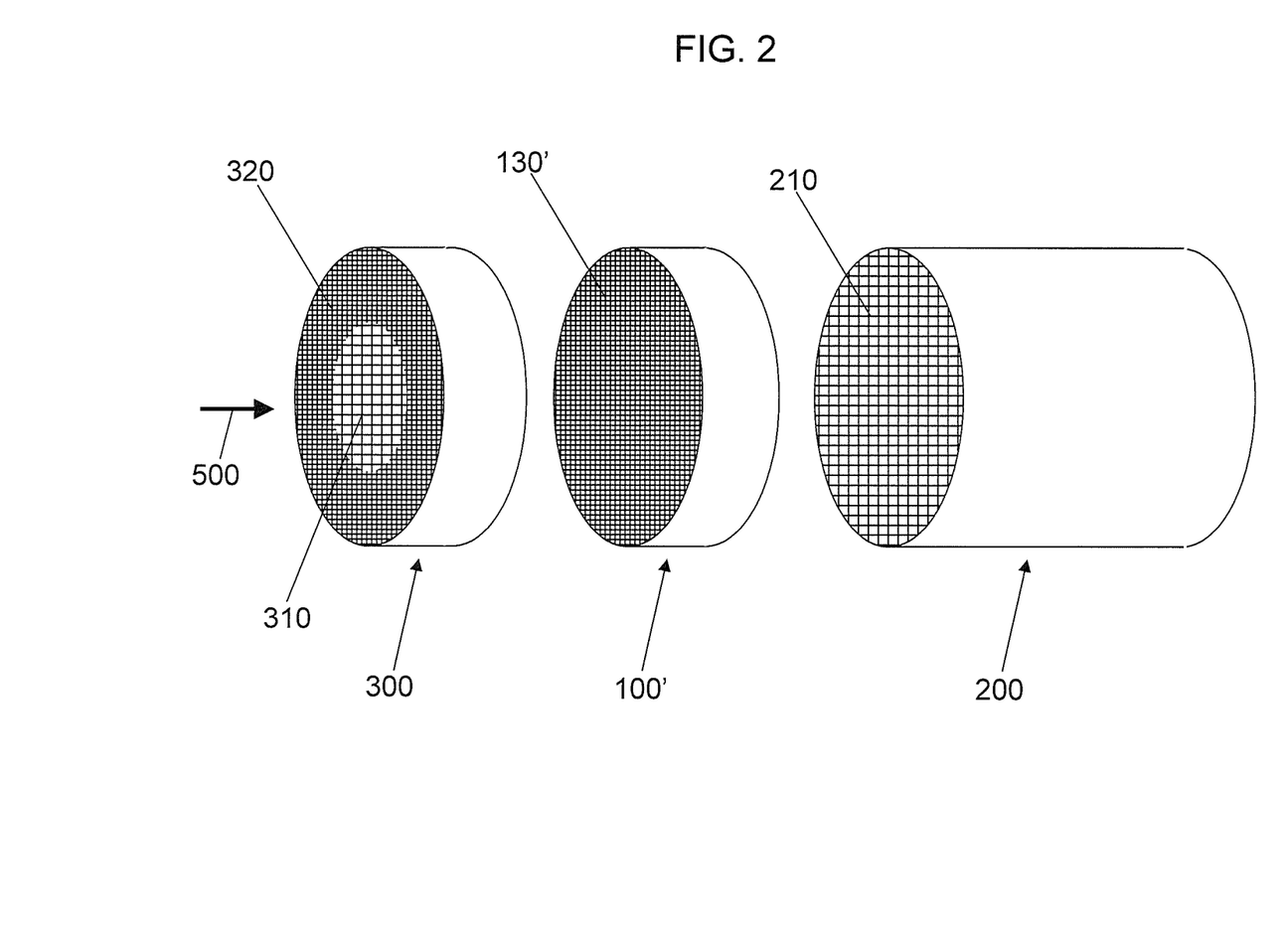
FIG. 2 illustrates an isometric view of another exemplary combination of substrates according to embodiments disclosed herein.

FIG. 2 illustrates another exemplary combination of substrates that can be used in exhaust gas after-treatment systems according to embodiments disclosed herein. The embodiment illustrated in FIG. 2 is identical to that illustrated in FIG. 1, except that first substrate 100' has first and second regions that have the same average cell density, shown together in FIG. 2 as region 130'.

Figure 3:
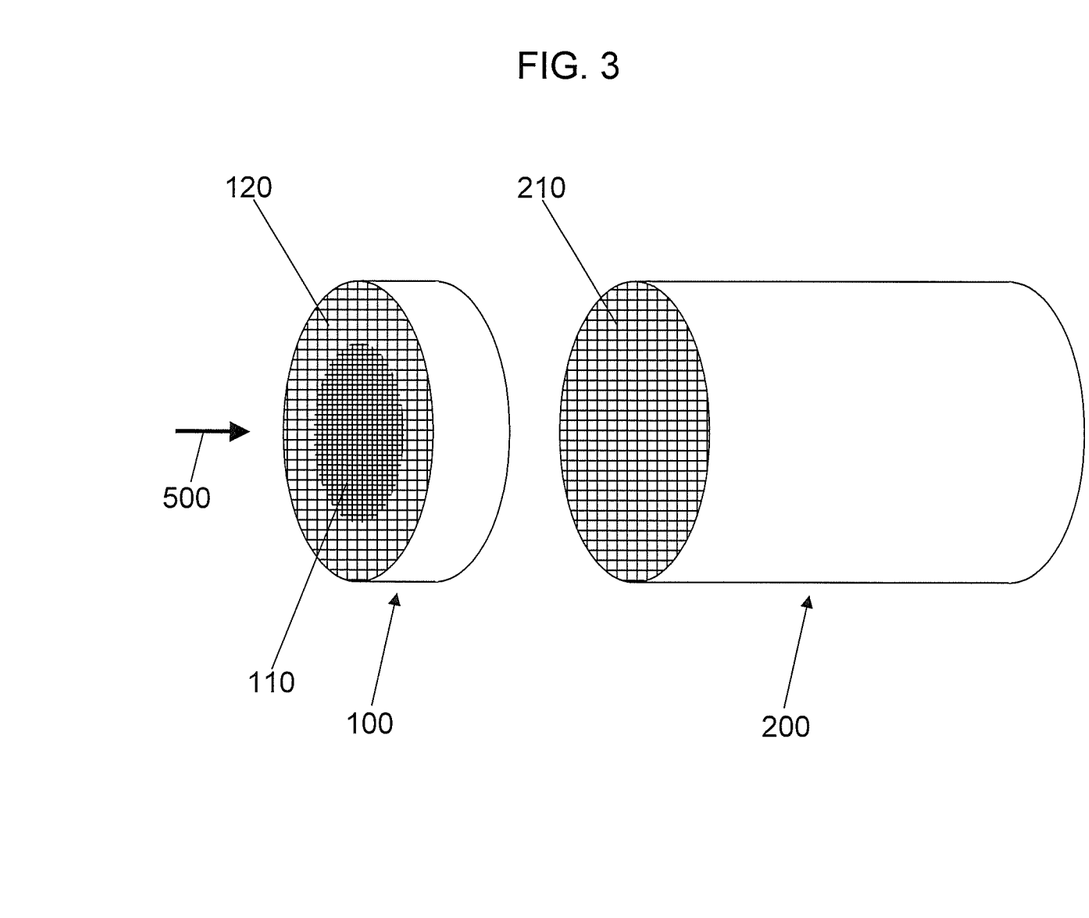
FIG. 3 illustrates an isometric view of another exemplary combination of substrates according to embodiments discloses herein.

FIG. 3 illustrates another exemplary combination of substrates that can be used in exhaust gas after-treatment systems according to embodiments disclosed herein. The embodiment illustrated in FIG. 3 is identical to that illustrated in FIG. 1, except that it does not include a third substrate.

While the embodiments illustrated in FIGS. 1-3 show a circular or elliptical cross-section, it is to be understood that the embodiments disclosed herein are not limited to such cross-sectional shapes. For example, embodiments disclosed herein can be applicable to polygonal (square, rectangular, hexagonal, octahedral) shapes, and the like.

The embodiments set forth below were analyzed using predictive modeling techniques. Modeling was conducted using DETCHEM software, version 2.3, available at www-.detchem.com. Models included incorporation of reaction kinetics for three way catalyst (TWC) as obtained from Hughes, K. W.; Flörchinger, P. "Ultra Thinwall Light-off Performance—Varying Substrates, Catalysts, and Flow Rates; Models and Engine Testing; SAE 2002-01-0352. Material and microstructure properties were obtained by measurement of commercially available Corning Incorporated cordierite substrates to model the thermal and mass transport. The catalyst distribution was assumed to be uniform within the washcoat.

An embodiment in accordance of FIG. 1 was analyzed using the predictive modeling techniques described above. The embodiment included a first substrate, a second substrate downstream from the first substrate, and a third substrate upstream from the first substrate. Each of the substrates was modeled as being generally cylindrically shaped with a diameter of about 5 inches. In addition, the first substrate was modeled as having an axial length of about 1.5 inches, a first region extending from a central axis of the first substrate to about 50% of an outer radius of the first substrate (in other words, a first region radius of about 1.25 inches), and a second region circumferentially surrounding the first region, wherein the first region was modeled as having an average cell density of about 900 cells per square inch and an average wall thickness of about 2 mils and the second region was modeled as having an average cell density of about 400 cells per square inch and an average wall thickness of about 4 mils. The second substrate was modeled as having an axial length of about 3 inches and a single region having an average cell density of about 400 cells per square inch and an average wall thickness of about 4 mils. The third substrate was modeled as having an axial length of about 1.5 inches, a first region extending from a central axis of the third substrate to about 50% of an outer radius of the third substrate (in other words, a first region radius of about 1.25 inches), and a second region circumferentially surrounding the first region, wherein the first region was modeled as having an average cell density of about 400 cells per square inch and an average wall thickness of about 4 mils and the second region was modeled as having an average cell density of about 900 cells per square inch and an average wall thickness of about 2 mils. The first substrate was modeled as being axially spaced from the second substrate such that the axial distance between their nearest surfaces was about 0.25 inches and modeled as being axially spaced from the third substrate such that the axial distance between their nearest surfaces was about 0.5 inches.

This embodiment was compared to a reference, which was modeled as a single substrate having a diameter of about 5 inches, an axial length of about 6 inches, and having a single region having an average cell density of about 400 cells per square inch and an average wall thickness of about 4 mils.

Figure 4A:
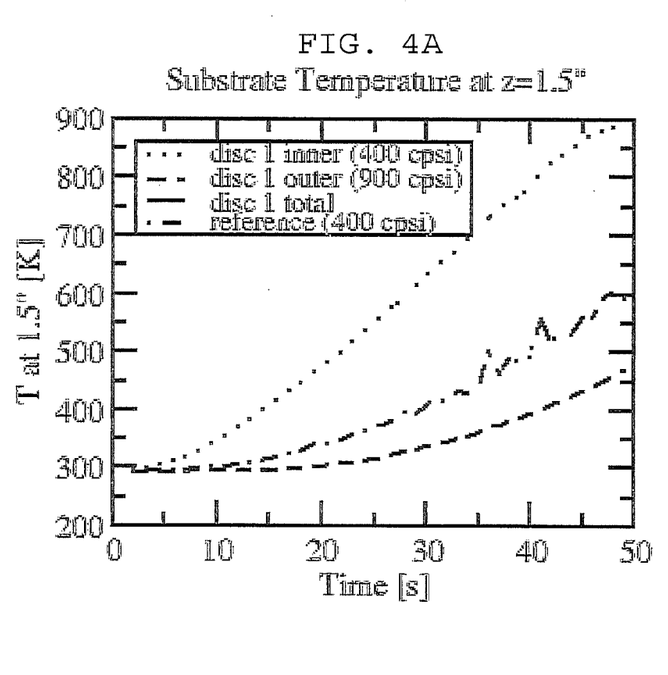
FIGS. 4A and 4B plot exemplary modeled substrate temperatures and hydrocarbon (HC) remaining as a function of time following cold start.

FIG. 4A illustrates the modeled temperatures of the third substrate in the embodiment as compared to that of the reference following cold start (at time=0). As can be seen, the average temperature of the first region of the third substrate increases much more rapidly over time than the second region of the third substrate or the reference. Specifically, within 20 seconds after cold-start, the average temperature of the first region of the third substrate is at least 150° C. higher than the average temperature of the second region of the third substrate. Within 30 seconds after cold-start, the average temperature of the first region of the third substrate is at least 250° C. higher than the average temperature of the second region of the third substrate. In addition, within 20 seconds after cold-start, the average temperature of the first region of the third substrate is at least 100° C. higher than the average temperature of the reference. Within 30 seconds after cold-start, the average temperature of the first region of the third substrate is at least 200° C. higher than the average temperature of the reference.

Figure 4B:
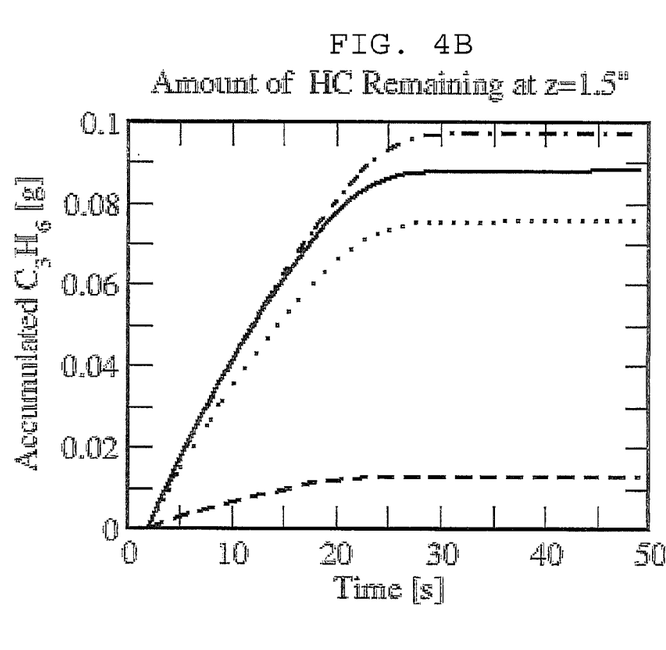

FIG. 4B illustrates modeled hydrocarbon (HC) remaining of the embodiment described above as compared to that of the reference.

Figure 5:
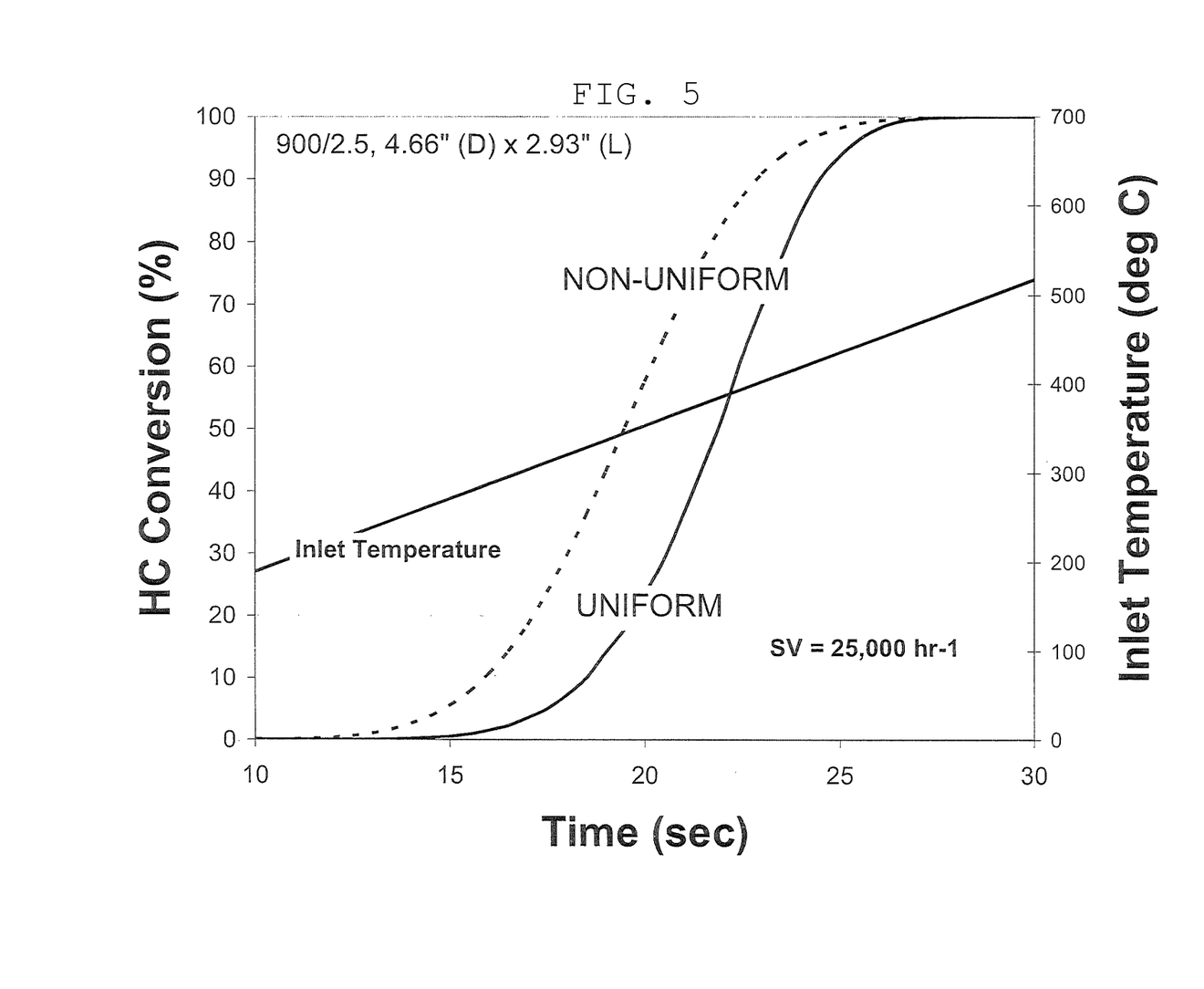
FIG. 5 plots exemplary modeled hydrocarbon (HC) conversion as a function of time through different substrates following cold start.

FIG. 5 illustrates the modeled conversion of a target species, specifically HC, of the embodiment as compared to that of a reference following cold start (at time=0, not shown). As can be seen, the embodiment converts HC more quickly than the reference, meaning the embodiment exhibits a faster light-off time than the reference. Specifically, the embodiment shows a light-off time of less than 20 seconds, whereas the reference shows a light-off time of greater than 20 seconds.

Figure 6A:
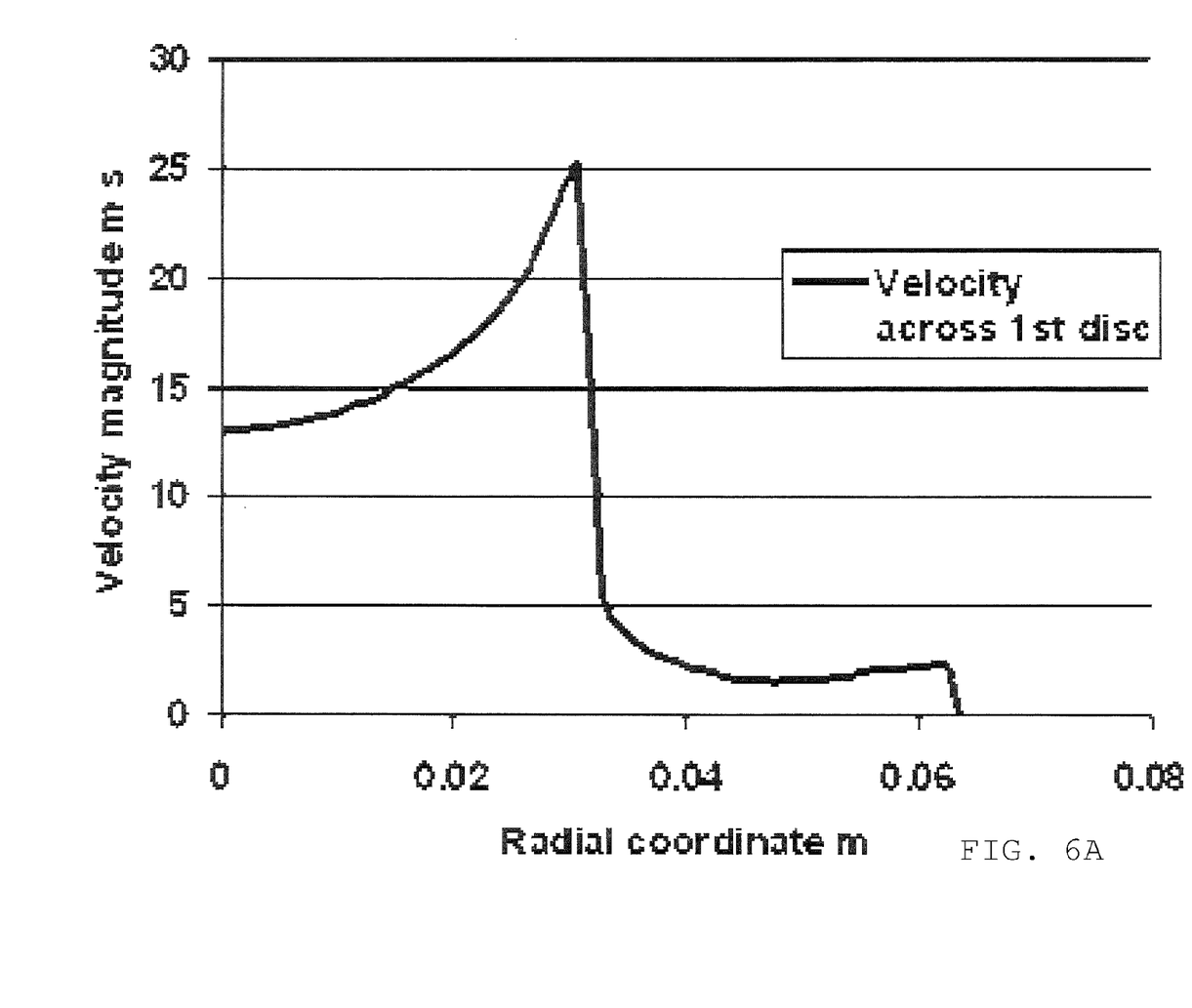
FIGS. 6A and 6B plot exemplary modeled flow profiles as a function of radial distance through different substrates.
Figure 6B:
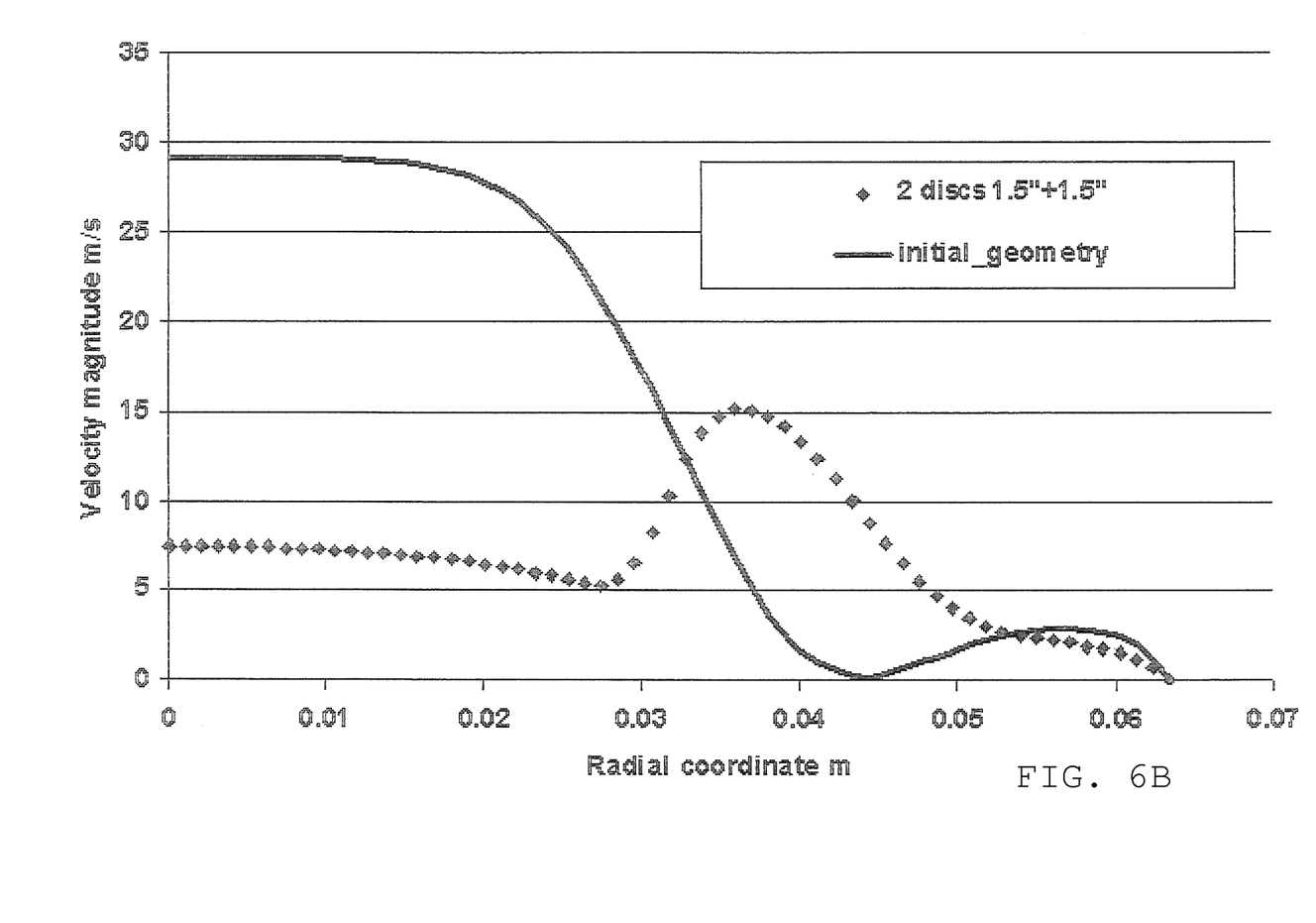

The embodiment can also provide for concentrated flow in the center of the third substrate (for faster light-off) while, at the same time, providing for more uniform flow in the second substrate, thereby enabling greater catalyst utilization in that substrate. FIG. 6A illustrates the modeled flow profile of exhaust fluid across the third substrate of the embodiment and FIG. 6B illustrates the modeled flow profile of exhaust fluid velocity across the second substrate of the embodiment as compared to the reference. As can be seen, flow across the third substrate is concentrated in the center, enabling more rapid temperature rise in that region following cold-start for faster light-off. In addition, a higher amount of the flow velocity of the second substrate is towards its (higher total surface area) outer radius as compared to the reference, wherein a greater amount of flow velocity is concentrated in its (lower total surface area) inner radius.

Figure 7A:
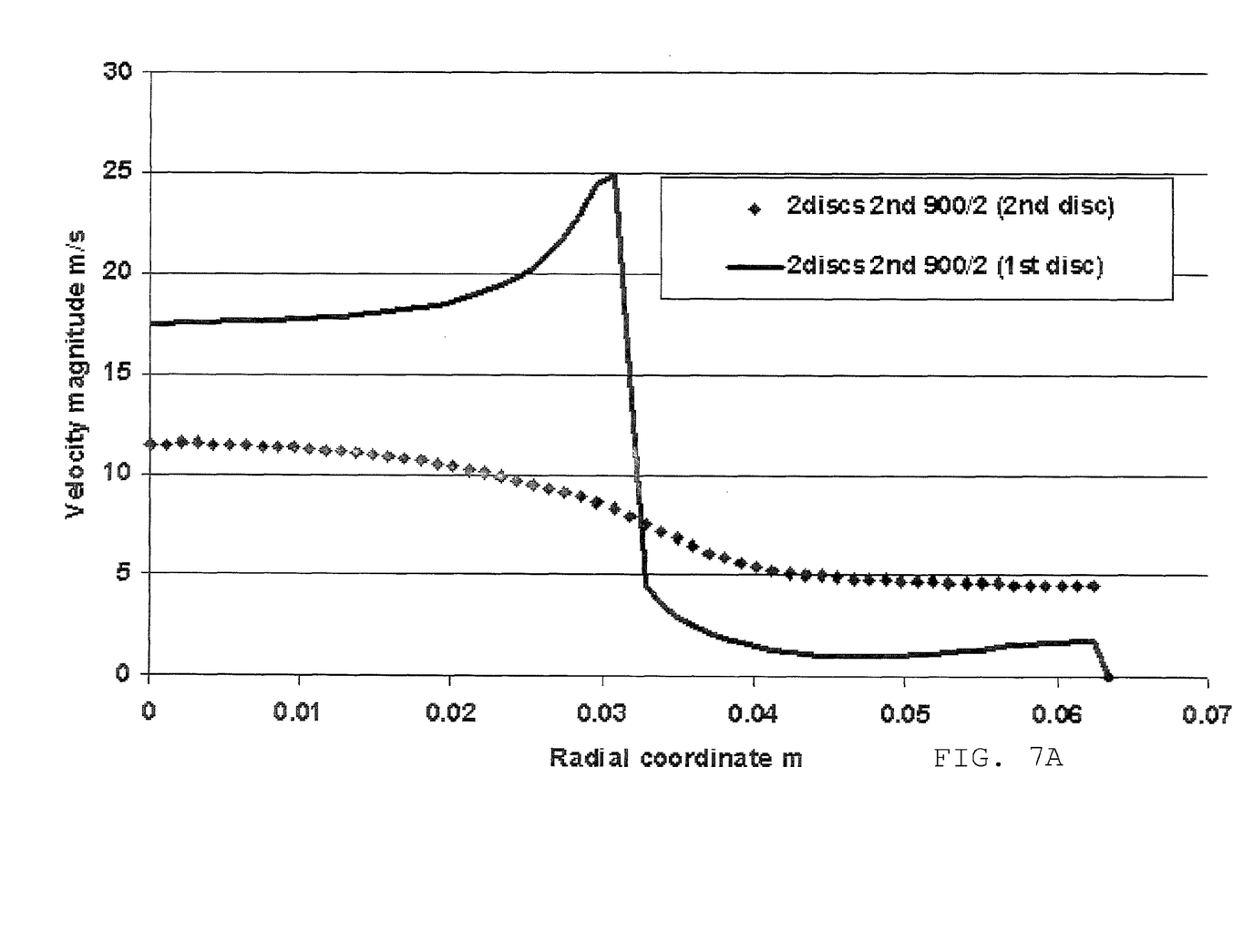
FIGS. 7A and 7B plot exemplary modeled flow profiles as a function of radial distance through different substrates.
Figure 7B:
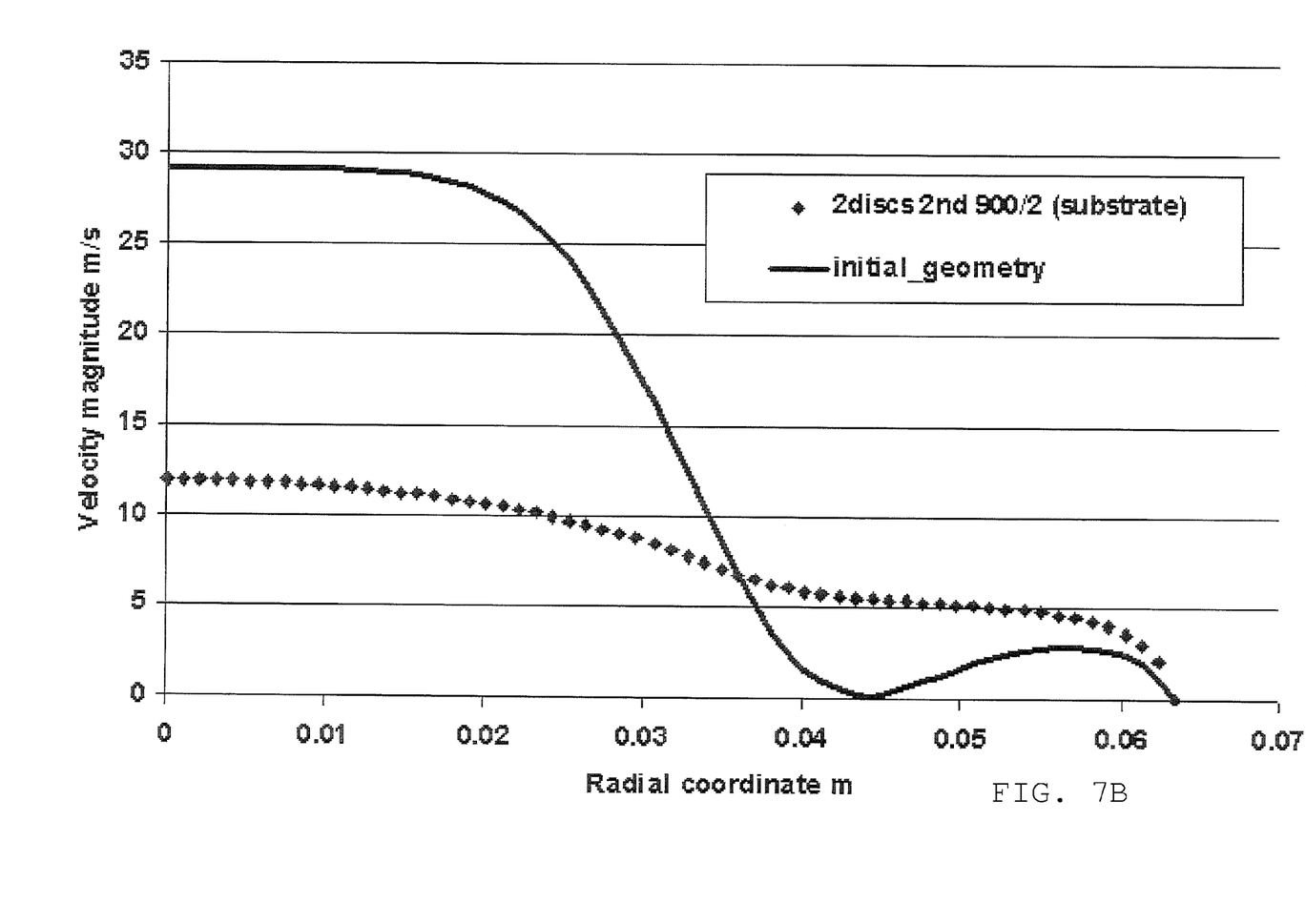

Modeled flow profiles for an alternative embodiment were also analyzed. This embodiment was modeled to be identical to the embodiment described above, except, as in FIG. 2, the first and second regions of the first substrate were modeled to have the same average cell density to provide, in effect, a single region having an average cell density of about 900 cells per square inch and an average wall thickness of about 2 mils. FIG. 7A illustrates the modeled flow profile of exhaust fluid across the first and third substrates of the alternative embodiment and FIG. 7B illustrates the modeled flow profile of exhaust fluid velocity across the second substrate of the alternative embodiment as compared to the reference. As can be seen, flow across the third substrate is concentrated in the center and a higher amount of the flow velocity of the second substrate is towards its outer radius as compared to the reference.

Figure 8A:
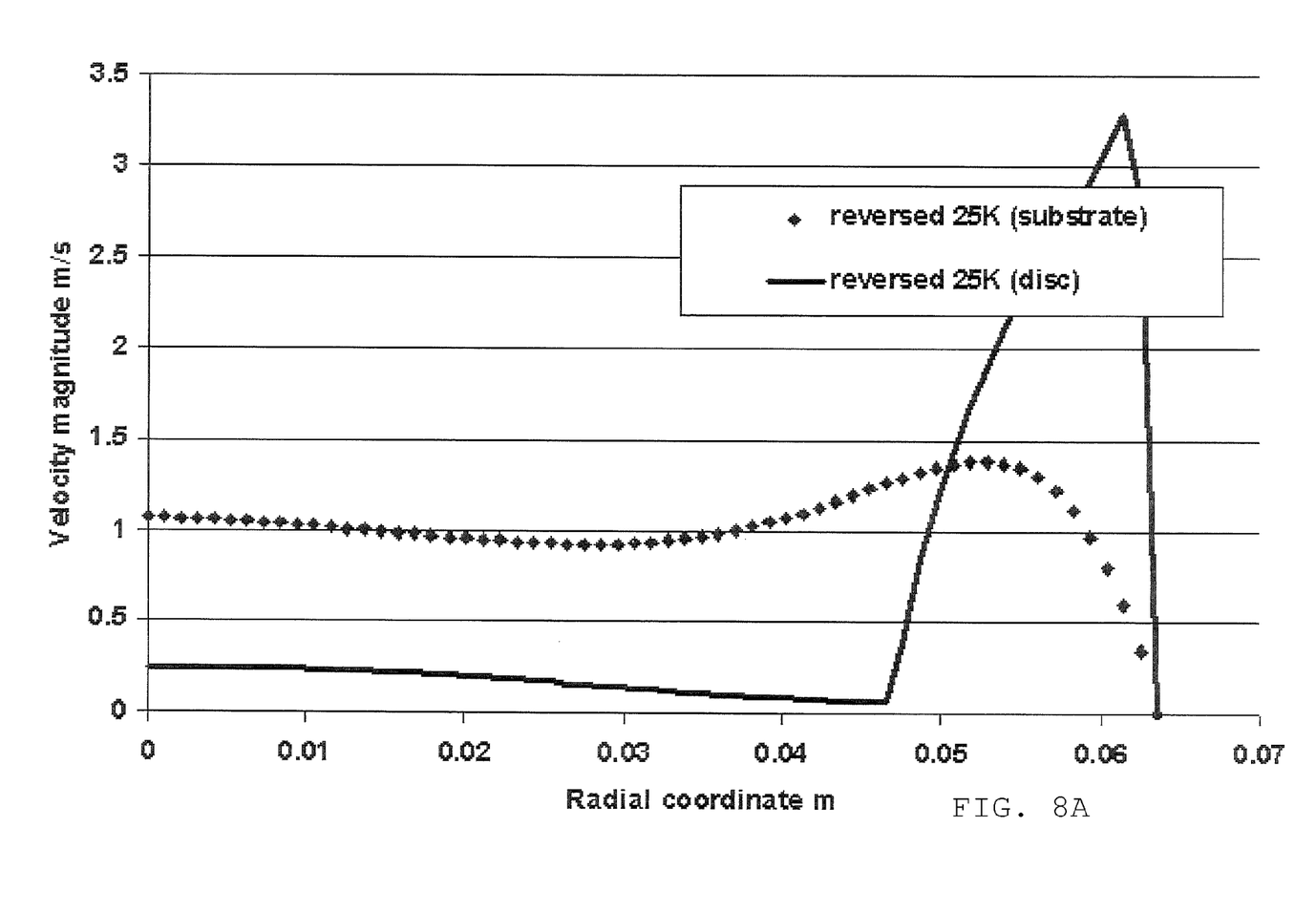
FIGS. 8A and 8B plot exemplary modeled flow profiles as a function of radial distance through different substrates.
Figure 8B:
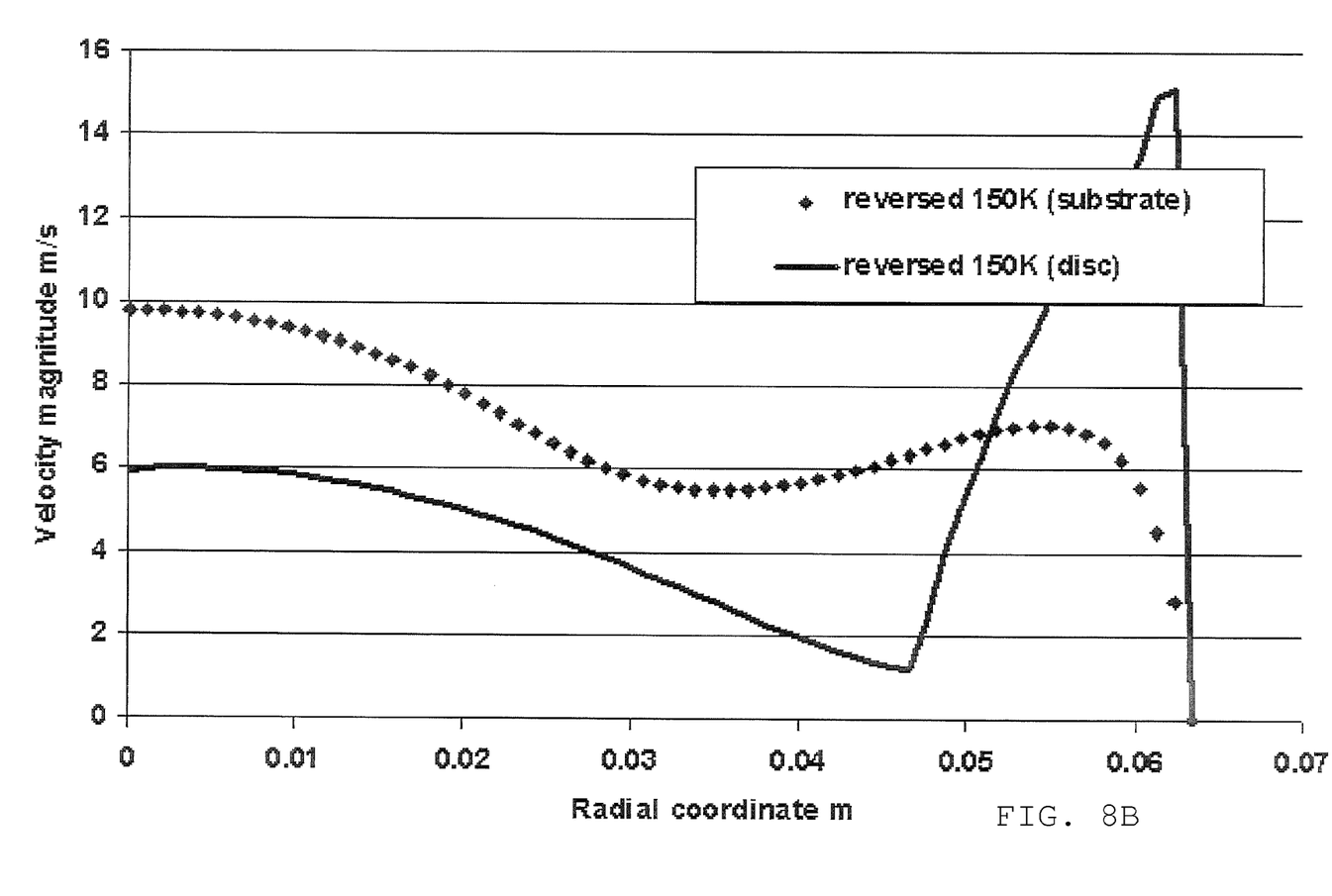

Modeled flow profiles for a second alternative embodiment were also analyzed. This embodiment was modeled to be identical to the embodiment described above, except, as in FIG. 3, without a third substrate. In addition, the second substrate was modeled as having an axial length of 4.5 inches and the first substrate was modeled as having a first region extending from a central axis of the first substrate to about 75% of an outer radius of the first substrate (in other words, a first region radius of about 1.875 inches), and a second region circumferentially surrounding the first region, wherein the first region was modeled as having an average cell density of about 900 cells per square inch and an average wall thickness of about 2 mils and the second region was modeled as having an average cell density of about 400 cells per square inch and an average wall thickness of about 4 mils. The first substrate was modeled as being axially spaced from the second substrate such that the axial distance between their nearest surfaces was about 1.5 inches. FIGS. 8A and 8B illustrated modeled flow profiles across of exhaust fluid velocity across the first and second substrates at different space velocities (25,000/hour and 150,000/hour, respectively, wherein the parameters 25,000/hour and 150,000/hour represent the volume ratio of the exhaust gas modeled as flowing through the substrate per hour to the volume of the available space in the substrate). As can be seen, relatively uniform flow velocity across the second substrate is observed.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An exhaust gas after-treatment system comprising:
   a first substrate comprising a first region and a second region circumferentially surrounding the first region;
   a second substrate downstream from the first substrate; and
   a third subtrate upstream from the first substrate, the third substrate comprising a first region and a second region circumferentially surrounding the first region;
   wherein the first region of the first substrate has a higher average cell density than the average cell density of the second substrate and the first region of the first substrate has a higher average cell density than the first region of the third substrate.

2. The system of claim 1, wherein the first region of the first substrate has a higher average cell density than the second region of the first substrate.

3. The system of claim 2, wherein the average cell density of the first region of the first substrate is at least twice the average cell density of the second region of the first substrate.

4. The system of claim 2, wherein the first region of the first substrate extends from a central axis of the first substrate to at least 75% of an outer radius of the first substrate.

5. The system of claim 1, wherein the second region of the third substrate has a higher average cell density than the first region of the third substrate.

6. The system of claim 5, wherein the first and second regions of the first substrate have the same average cell density.

7. The system of claim 5, wherein the second region of the third substrate has a higher average cell density than the second region of the first substrate.

8. The system of claim 7, wherein the first region of the first substrate has a higher average cell density than the second region of the first substrate.

9. The system of claim 5, wherein the average cell density of the second region of the third substrate is at least twice the average cell density of the first region of the third substrate.

10. The system of claim 5, wherein the first region of the third substrate extends from a central axis of the third substrate to at least 50% of an outer radius of the third substrate.

11. An exhaust gas after-treatment system comprising:
    a first substrate comprising a first region and a second region circumferentially surrounding the first region;
    a second substrate downstream from the first substrate;
    wherein the first region of the first substrate has a higher average cell density than the average cell density of the second substrate and the second substrate has an axial length that is at least twice an axial length of the first substrate.

12. The system of claim 11, wherein the second substrate has an axial length that is greater than or equal to combined axial lengths of the first substrate and the third substrate.

13. A method of operating an exhaust gas after-treatment system comprising:
    during a cold-start, directing exhaust gas through a first substrate comprising a first region and a second region circumferentially surrounding the first region, through a second substrate downstream from the first substrate and through a third substrate upstream from the first substrate, the third substrate comprising a first region and a second region circumferentially surrounding the first region;
    wherein the first region of the first substrate has a higher average cell density than the average cell density of the second substrate and first region of the first substrate has a higher average cell density than the first region of the third substrate.

14. The method of claim 13, wherein the second region of the third substrate has a higher average cell density than the first region of the third substrate.

15. The method of claim 14, wherein the average cell density of the second region of the third substrate is at least twice the average cell density of the first region of the third substrate.

16. The method of claim 14, wherein the first region of the third substrate extends from a central axis of the third substrate to at least 50% of an outer radius of the third substrate.

17. The method of claim 14, wherein 30 seconds after cold-start, the average temperature of the first region of the third substrate is at least 250° C. higher than the average temperature of the second region of the third substrate.

18. The method of claim 14, wherein the light-off time is less than 20 seconds.

* * * * *